July 17, 1923.  1,461,975
W. B. EATON ET AL
SLIDE RULE
Filed April 22, 1921
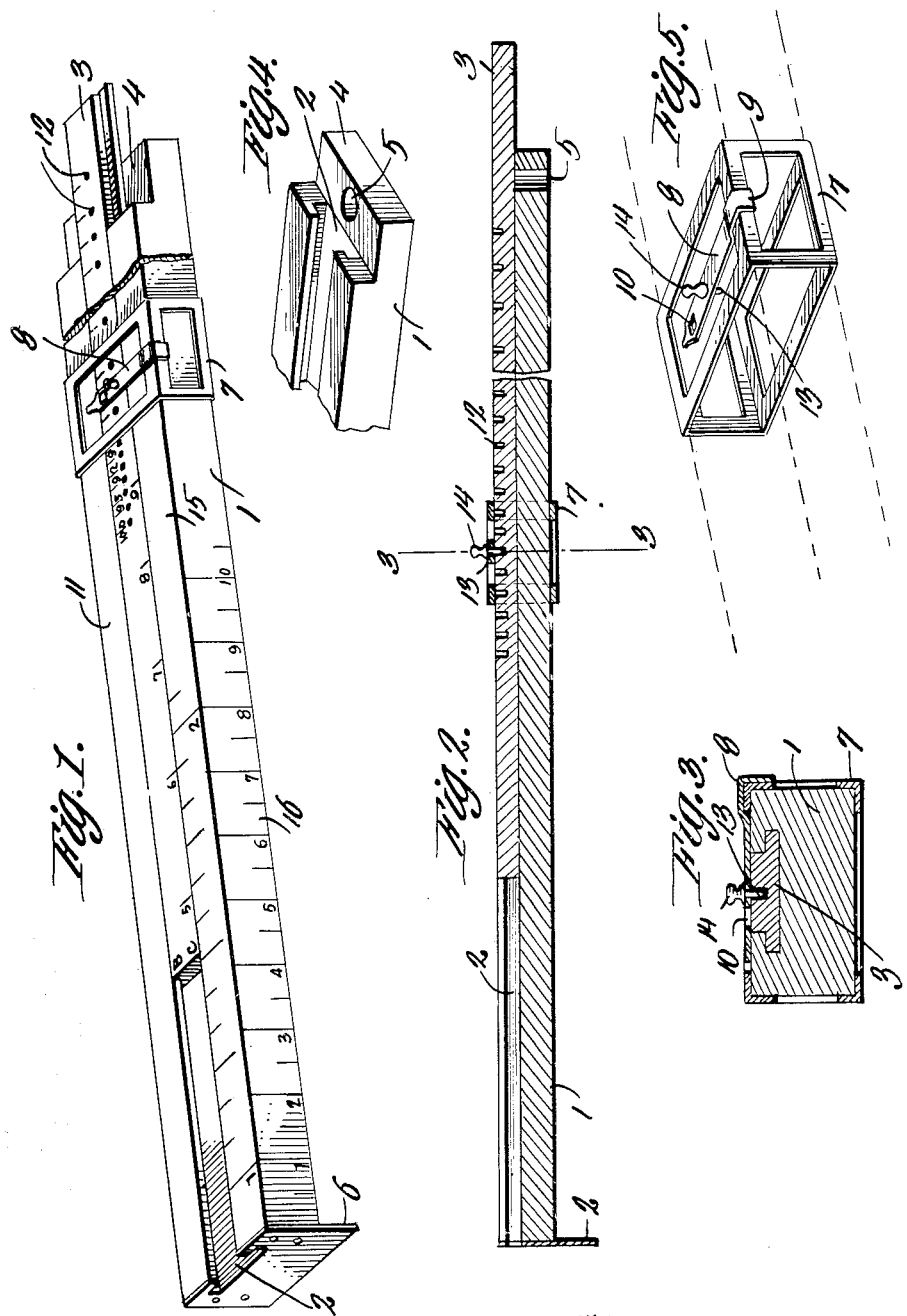
WITNESSES
WILFRED B. EATON
THOMAS D. LAMAY   INVENTOR.
BY
  ATTORNEY.

Patented July 17, 1923.

1,461,975

UNITED STATES PATENT OFFICE.

WILFRED B. EATON AND THOMAS D. LA MAY, OF SEATTLE, WASHINGTON.

SLIDE RULE.

Application filed April 22, 1921. Serial No. 463,528.

*To all whom it may concern:*

Be it known that we, WILFRED B. EATON and THOMAS D. LA MAY, citizens of the United States, residing at Seattle, in the county of King and State of Washington, have invented certain new and useful Improvements in Slide Rules, of which the following is a specification.

This invention relates to slide rules and has for its principal object to provide a device of this nature for determining the cubic contents of any space or solid body.

Another object of the invention is to generally improve upon slide rules of this nature by providing a device which will be of extremely simple construction and which will be efficient and reliable in operation.

With the above and numerous other objects in view, the invention consists in certain novel combinations and arrangement and construction of parts as will be hereinafter more fully described.

In the drawing:—

Figure 1 is a perspective view of the slide rule showing an intermediate portion broken away, Figure 2 is a longitudinal section taken therethrough, Figure 3 is a transverse section taken on the line 3—3 of Figure 2, Figure 4 is a fragmentary perspective view showing one end of the base of the slide rule, and Figure 5 is a detailed perspective view of the indicating frame used in connection with the slide rule.

Referring to the drawings by numerals it will be seen that 1 designates the base which is provided with the T-groove 2 for receiving the slide 3 in the usual manner. The base 1 is reduced at 4 and provided with the aperture 5 so that the rule may be engaged with a hook when not in use. At the other end of the base there is provided a plate 6 which is cut away so as to register at its upper end with the groove 2 while its lower end extends beyond the bottom of the base as shown to advantage in Figure 2, whereby the rule may be easily engaged with the end of a body such as a table if so desired.

An indicating frame 7 is slidably mounted on the base 1 and is preferably constructed so as to have all its faces open. The upper face must be open so as to receive the indicating arm 8 which is suitably fixed to the frame at 9. The free end of this indicating arm 8 is pointed and provided with a suitable opening 10 so that the indices on slide 3 may be seen therethrough. The point on the indicating arm 8 is adapted to be registered with the indices upon the side 11 of the base 1. In order to register the indicating arm 8 with the indices on the slide 3 we have provided this slide with a plurality of indentures 12 in registry with the various indices thereon. The indicating arm 8 is provided with the depending lug 13 which is adapted to be inserted in these indentures 12. A suitable knob 14 is fixed to the upper surface of the arm 8 so that same may be lifted from out of engagement with the slide 3. It should be understood that this arm 8 is preferably constructed of such material as spring metal or the like having sufficient resiliency so that it may be moved away from the slide 3 when it is desired to move the frame independently thereof.

To obtain the desired cubic measurement of any given space or body the dimensions thereof should first be secured namely the length, breadth and thickness in inches by aid of the lineal measurements on either the front or back of the slide rule. The lug 13 should first be placed in the indenture 12 registering with the index corresponding with the first dimension. The slide 3 will then be moved so that the point of the indicating arm 8 will register with the index on the face 11 corresponding to the second dimension and the cubic measurement in feet may now be obtained by reading the index on face 15 opposite the index in row C on slide 3 corresponding with the third dimension. It should be understood that the indentures 12 are in registry with the indices in row B on slide 3.

From the foregoing description, taken in connection with the accompanying drawings, the construction and operation of the slide rule may be readily be understood without a more extended explanation. As numerous changes in form, proportion, and in the minor details of construction may be resorted to without departing from the spirit of this invention, we do not wish to be limited to the construction herein shown and described other than as claimed.

Having thus described our invention what we claim as new is:—

1. In combination, a base provided with a reduced portion at one end and a groove extending longitudinally thereof and terminating at the reduced portion, the bottom of said groove being co-planar with the surface of said reduced portion, and a slide mounted in said groove and movable over said reduced portion.

2. In combination, a base provided with a longitudinally extending groove in one face, a slide movably mounted in said groove, a frame slidably mounted on the base, a spring arm fixed to the frame and extending over the slide, said slide provided with a series of indentures, and a lug situated on the arm and engageable with said indentures.

In testimony whereof we affix our signatures in presence of two witnesses.

WILFRED B. EATON.
THOMAS D. LA MAY.

Witnesses:
E. B. BABCOCK,
L. R. GILBERT.